Aug. 22, 1933.  N. SKILLMAN  1,923,892

STEERING COLUMN BEARING

Filed July 1, 1929

Fig. 6-A

INVENTOR.
Newton Skillman
BY
Stuart C. Barnes
ATTORNEY.

Patented Aug. 22, 1933

1,923,892

UNITED STATES PATENT OFFICE 1,923,892

STEERING COLUMN BEARING

Newton Skillman, Detroit, Mich., assignor to O. & S. Bearing Company, Detroit, Mich., a Corporation of Michigan Application July 1, 1929. Serial No. 375,004

11 Claims. (Cl. 308—238)

This invention relates to steering column bearings, and more particularly to an extremely simple bearing member which acts both as a spacer member and a permanent self-lubricating bearing or bushing for the shaft.

It has been the general practice in the past to form bearing members of this type of a steel outer shell with a relatively thick lining or bushing of lubricant impregnated fibrous material, the outer shell having a press fit in the casting or housing, and the fibrous material bushing expansibly engaging the shaft to provide a non-rattling, noiseless, permanent bearing member. Such bearings have proven very satisfactory and have permitted quite wide variations in the dimensions of the relative parts connected by the bearing. Some installations such as for steering columns, and the like, have a relatively large space between the shaft and the outer housing or casting which has necessitated the use of a relatively thick inner lining of lubricant impregnated fibrous material and while this thickness of the fibrous material added life to the bearing, such added life was not generally necessary and instead merely added considerable expense to the cost of the bearing.

It is the object of the present invention to provide a bearing member for relatively movable parts, having a relatively large space therebetween such as is found in steering columns. More specifically, the bearing of the present invention consists of a metal outer member quite similar to the outer metal shell of the self-lubricating bearings above referred to, but which outer shell is so formed as to present two annular steel shells with a space therebetween, the outer steel shell resiliently engaging the casting or steering column tube, and the inner shell carrying the lubricant impregnated fibrous material for contact with the pin or shaft.

In the drawing:

Fig. 6a is a longitudinal sectional view showing a modified form of bearing wherein the outer shell is formed substantially spherical in shape.

Figure 7:
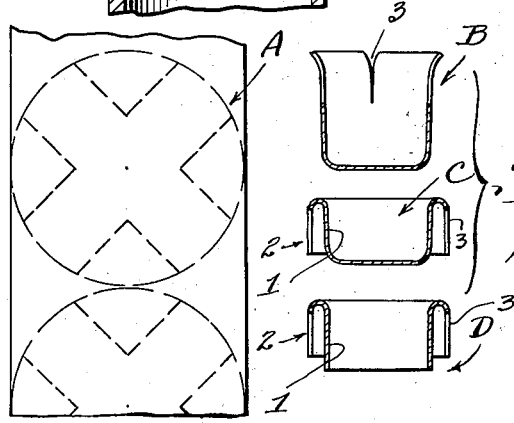

Fig. 7 diagrammatically illustrates the successive steps in my preferred method of fabricating the bearing from flat metal stock.

The bearing itself is preferably formed from flat stock, as diagrammatically illustrated in Fig. 7. A flat piece of stock may be stamped out as shown at A so as to provide cut out outer portions with a solid center. This flat stock is then preferably subjected to a drawing operation so as to give the general shape shown at B. The next operation may be a forming operation as shown at C wherein the stamping takes the general form of the bearing. The next operation, as diagrammatically illustrated at D may be a perforating and sizing operation to form a complete bearing. The final completed bearing is thus provided with an inner cylindrical portion 1 and a spaced annular outer portion 2. This turned back portion 2 of the outer shell of the member is preferably slotted as at 3, said slots being formed by the bringing together of the cut out portions of the original flat blank. While the slots 3 are shown as terminating within the length of the outer annular portion 2, it will be understood that such slots may vary in length as desired. It will also be understood that this final completed integral member with the spaced shells may be fabricated in many different ways as will be understood by those skilled in the art.

Figure 4:
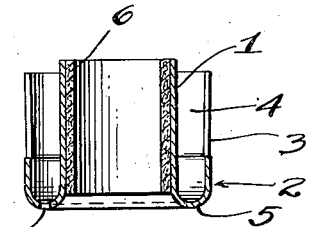
Fig. 4 is a longitudinal section taken on line 4—4 of Fig. 3.
Figure 5:
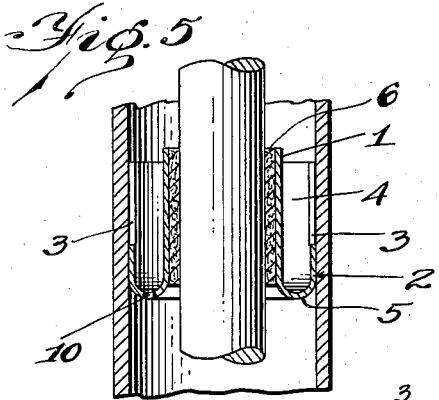
Fig. 5 is a fragmentary longitudinal section showing the bearing as installed in a steering column assembly.

The spaced portions 4 formed by the slots 3 preferably extend outwardly, as shown in Fig. 4, so as to form resilient bearing members for contacting with the outer tube or casting. The bottom of the bearing member being rounded as at 5, it will be obvious that this will permit easy insertion of the bearing into the tube or housing, after which further insertion of the bearing into position will cause the resilient members 4 to contact with the outer housing and thus positively position the bearing in place and compensate for any variations in diameter, or smoothness of the surface, of the outer tubing.

Having formed the metal outer shell, I preferably provide a lubricant impregnated lining or bushing 6 which may be formed by gluing a strip of lubricant impregnated fibrous material to the inner walls of the portion 1, and then compressing and shaping the inner walls of this bushing 6 so as to properly fit a particular shaft. The limits of such bushing 6 may be controlled very accurately and the dimensions are preferably always such that in addition to the inherent expansibility of the bushing there is a slight radial compression given thereto by the assembly of the bearing on the shaft.

The compression produced by the assembly may be very small, and theoretically there may be just a pefect fit between the bushing and shaft, but some compression is practically necessary in order to prevent rattling. However, regardless of the degree of contact between the shaft and the bushing, or whether the compressibility is supplied by the assembly or by the inherent compressibility of the material, the main point here to be considered is that a relatively thin lining of fibrous material is secured to the inner wall of the portion 1 and the spacing is accomplished by the inherent structure of the bearing itself rather than by providing an extra depth of fibrous material to make up for the space between the shaft and the housing.

Figure 1:
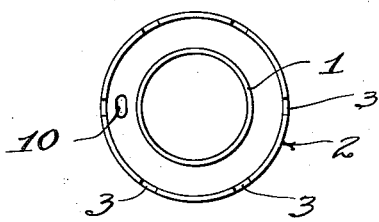
Fig. 1 is a plan view of the bearing showing the spacing of the two shells.
Figure 3:
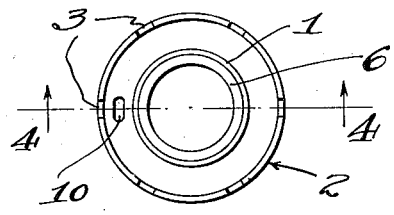
Fig. 3 is a plan view similar to Fig. 1, but illustrating the lubricant impregnated bushing in place.
Figure 2:
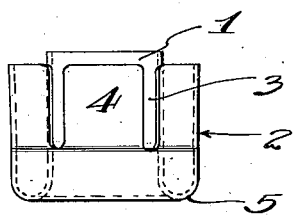
Fig. 2 is a front elevation of the bearing showing the preferred manner of slotting the outer shell to make the same resilient.
Figure 6:
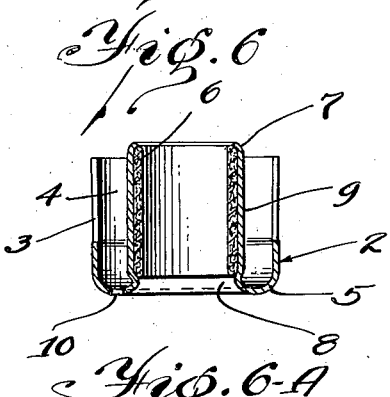
Fig. 6 is a longitudinal section of a modified form of bearing.

It will be obvious that the lubricant impregnated fibrous lining may be secured within the bearing in many different ways and in Fig. 6 I have shown a second method of fabricating the bearing wherein the inner portion of the shell is formed with upper and lower cupped in portions 7 and 8. The outer shell 2 of this bearing member may be turned back or formed in the same way as the bearing shown in Figs. 1, 2, and 4, and this bearing will preferably be formed from a single length of tubing of the diameter of the inner portion 9, the parts 7 and 8 being spun or pressed in in any suitable manner. The turned in portions 7 and 8 are preferably so formed after the fibrous lining 6 has been positioned in place. The bushing 6 as used in the type of bearing shown in Fig. 7, after once being compressed and preformed will be maintained in position by the necked in portions 7 and 8 of the bearing, thus eliminating the use of glue.

The base or rounded portion of the bearing 5 is preferably provided with a slot 10 whereby to permit the passing of insulated wires therethrough when used in connection with certain types of steering gears.

While I preferably form my novel bearing member with two annular and substantially parallel shells, it will be obvious that the shape of such shells may vary considerably and that the outer shell may be formed substantially spherical in shape, as shown in Fig. 6a, this latter modified form being particularly adaptable to steering assemblies having considerable space between the housing and shaft, and also to bearing assemblies having surfaces which would more readily fit a spherical outer shell than a cylindrical outer shell.

What I claim is:

1. A bearing for a member of the type having an outer column and a relatively movable inner shaft spaced therefrom, comprising two annular integral shells, the outer shell being turned back in spaced relation to and encircling the inner shell, and a bushing formed of expansible lubricant impregnated material supported by said inner shell, the outer shell being slotted to present spaced portions for resiliently engaging the column and said inner shell being inwardly embossed at both ends whereby to assist in locking the bushing in position.

2. A bearing for a steering gear of the type having an outer column and a relatively movable inner shaft spaced therefrom, comprising an inner rigid cylindrical shell and a relatively thin lining of expansible lubricant impregnated fibrous material, and resilient means forming an extension of said shell and surrounding said cylindrical shell for positioning the bearing in the column and spacing said inner shell from said outer column.

3. A bearing for a steering gear of the type having an inner shaft and an outer column spaced therefrom, comprising a metal shell having an expansible lining of lubricant impregnated fibrous material, said shell having an inner cylindrical portion for supporting the fibrous material and a resilient portion encircling said cylindrical portion and spaced therefrom for engaging the walls of said column.

4. A bearing for a steering gear of the type having a tubular column and a relatively movable shaft spaced therefrom, comprising spaced walls for taking up substantially all the space between the column and the shaft, the inner wall being rigid and the outer wall being resilient and encircling the inner wall, and a relatively thin expansible lining of self-lubricating material supported by the rigid wall of said bearing for engaging the shaft.

5. A bearing comprising a positioning and supporting element formed of integral spaced inner and outer metallic shells, said inner shell being solid and said outer shell slotted and encircling the inner shell, and a bushing member of compressible lubricating material supported by the inner shell.

6. A bearing comprising two annular integral shells, the outer shell being turned back in spaced substantially parallel relation to and encircling the inner shell, and a bushing formed of expansible lubricant impregnated material supported by said inner shell.

7. A bearing for a member of the type having an outer column and a relatively movable inner shaft spaced therefrom, comprising two annular integral shells, the outer shell being turned back in spaced substantially parallel relation to and surrounding the inner shell, said inner shell being rigid and a bushing formed of expansible lubricant impregnated material supported by said inner shell, the lower end of the bearing formed by the connected inner and outer shells being arcuate in longitudinal cross section whereby to permit easy entrance into the tubular column.

8. A bearing for a member of the type having an outer column and a relatively movable inner shaft spaced therefrom, comprising two annular integral shells, the outer shell being turned back in spaced relation to and encircling the inner shell, and a bushing formed of expansible lubricant impregnated material supported by said inner shell, the outer shell being slotted to present spaced portions for resiliently engaging the column.

9. A bearing for a member of the type having an outer column and a relatively movable inner shaft spaced therefrom, comprising two annular integral shells, the outer shell being turned back in spaced relation to and overlying the inner shell, a bushing formed of expansible lubricant impregnated material supported by said inner shell, the lower end of the bearing formed by the connected inner and outer shells being arcuate in longitudinal cross section whereby to permit easy entrance into the tubular column, and the upper portion of the outer shell being slightly flared whereby to permit engagement with steering columns of varying diameters.

10. A bearing for a member of the type having an outer column and a relatively movable inner shaft spaced therefrom, comprising two annular integral shells, the outer shell being turned back in spaced relation to and encircling the inner shell, said inner shell being rigid, a bushing formed of expansible lubricant impregnated material supported by said inner shell, the lower end of the bearing formed by the connected inner and outer shells being arcuate in longitudinal cross section whereby to permit easy entrance into the tubular column, and the upper portion of the outer shell being slotted and slightly flared whereby to permit resilient engagement with steering columns of varying diameters.

11. A bearing for a member of the type having an outer column and a relatively movable inner shaft spaced therefrom, comprising two annular spaced walls, one wall being rigid and the other relatively resilient and encircling the rigid wall, and a bushing of expansible self-lubricating material for engaging the shaft, the greater portion of the space between the column and the shaft being taken up by said spaced walls.

NEWTON SKILLMAN.